United States Patent
Jamil et al.

(10) Patent No.: US 6,718,494 B1
(45) Date of Patent: Apr. 6, 2004

(54) METHOD AND APPARATUS FOR PREVENTING AND RECOVERING FROM TLB CORRUPTION BY SOFT ERROR

(75) Inventors: Sujat Jamil, Chandler, AZ (US); Hang Hguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 09/746,765

(22) Filed: Dec. 22, 2000

(51) Int. Cl.[7] ............................................. G11C 29/00
(52) U.S. Cl. ..................... 714/723; 714/718; 714/800
(58) Field of Search ........................... 714/718, 723, 714/763, 764, 766, 746, 799, 800, 801, 701; 711/118

(56) References Cited

U.S. PATENT DOCUMENTS 6,226,763 B1 * 5/2001 Fu et al. ......................... 714/53
6,457,067 B1 * 9/2002 Byers et al. ..................... 710/3
6,543,028 B1 * 4/2003 Jamil et al. ................... 714/800

* cited by examiner

Primary Examiner—Phung M. Chung
(74) Attorney, Agent, or Firm—Blakely, Sokoloff, Taylor & Zafman LLP

(57) ABSTRACT

A detection and recovery mechanism is herein disclosed for soft errors corrupting TLB data. The mechanism works with a hardware page walker (HPW) and instruction steering control mechanisms in a processor to provide soft error recovery in the TLB arrays and latches. Through use of the disclosed detection and recovery mechanism, efficient and robust protection from silent data corruption is provided without requiring more expensive built-in redundancy.

30 Claims, 7 Drawing Sheets

METHOD AND APPARATUS FOR PREVENTING AND RECOVERING FROM TLB CORRUPTION BY SOFT ERROR

FIELD OF THE INVENTION

This invention relates generally to the field of computer systems, and in particular to preventing and recovering from TLB corruption due to soft errors.

BACKGROUND OF THE INVENTION

As fabrication processes improve over time, the size of storage elements decreases making them more susceptible to soft errors. Soft errors occur when incident radiation changes the electrical charge being held by a storage element, thereby changing its binary state. As the statistical significance of soft errors has been increasing, storage structures such as latches that were previously less prone to soft errors are now in need of protection.

Soft errors, if undetected, can silently corrupt data for a program during its execution. If the program continues to execute incorrect results may be generated. This type of silent data corruption (SDC) is especially undesirable in mission critical applications, such as for commercial transaction server applications, where wrong results can have broad-reaching implications.

Translation lookaside buffers (TLBs) have used parity checking and functional redundancy in their arrays to check for soft errors in virtual page numbers, physical frame numbers, etc. However, redundancy requires significant additional circuitry to provide error correction, and parity alone provides a detection mechanism but not a correction mechanism. Furthermore, detecting and correcting soft errors in the latches that receive output data when the array is read have not previously been addressed.

BRIEF DESCRIPTION OF THE DRAWINGS

The present invention is illustrated by way of example and not limitation in the figures of the accompanying drawings.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
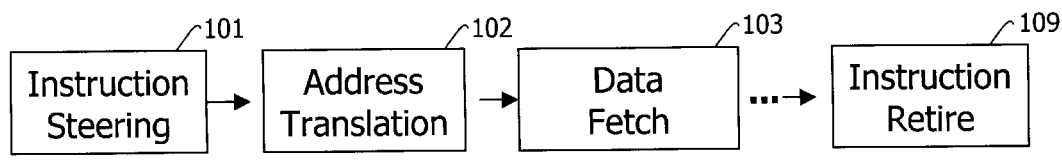
FIG. 1 illustrates one embodiment of a processor pipeline.

Modern processors are often heavily pipelined to increase operating frequencies and exploit parallelism. FIG. 1 illustrates one embodiment of a processor pipeline wherein the front end of the pipeline includes instruction steering stage 101, address translation stage 102, and data fetch stage 103; and the back end of the pipeline culminates with instruction retirement stage 109. Data from successive stages is often stored or latched to provide inputs to the next pipeline stage. As devices become smaller with each process generation, these latches become increasingly more susceptible to soft errors.

Parity bits are often calculated for and stored with corresponding data in large storage structures for the purpose of detecting errors, including soft errors occurring in those storage structures. For example, address translation stage 102 may perform translation from a virtual address to a physical address using a storage structure called a translation lookaside buffer (TLB).

A detection and recovery mechanism is herein disclosed for soft errors corrupting TLB data. The mechanism works with a hardware page walker (HPW) and instruction steering control mechanisms in a processor to provide soft error recovery in the TLB arrays and latches. Through use of the disclosed detection and recovery mechanism, efficient and robust protection from silent data corruption is provided without requiring more expensive built-in redundancy.

When data is read from the TLB array, that data is typically used to generate a parity bit and the parity bit generated is compared to a previously computed and stored parity bit to detect an error. If the two parity bits match, the output data is latched and the parity bit is typically discarded. Instead of discarding the previously computed parity bit, it may be latched along with the output data and then used to recheck the data at the latch outputs.

Figure 2:
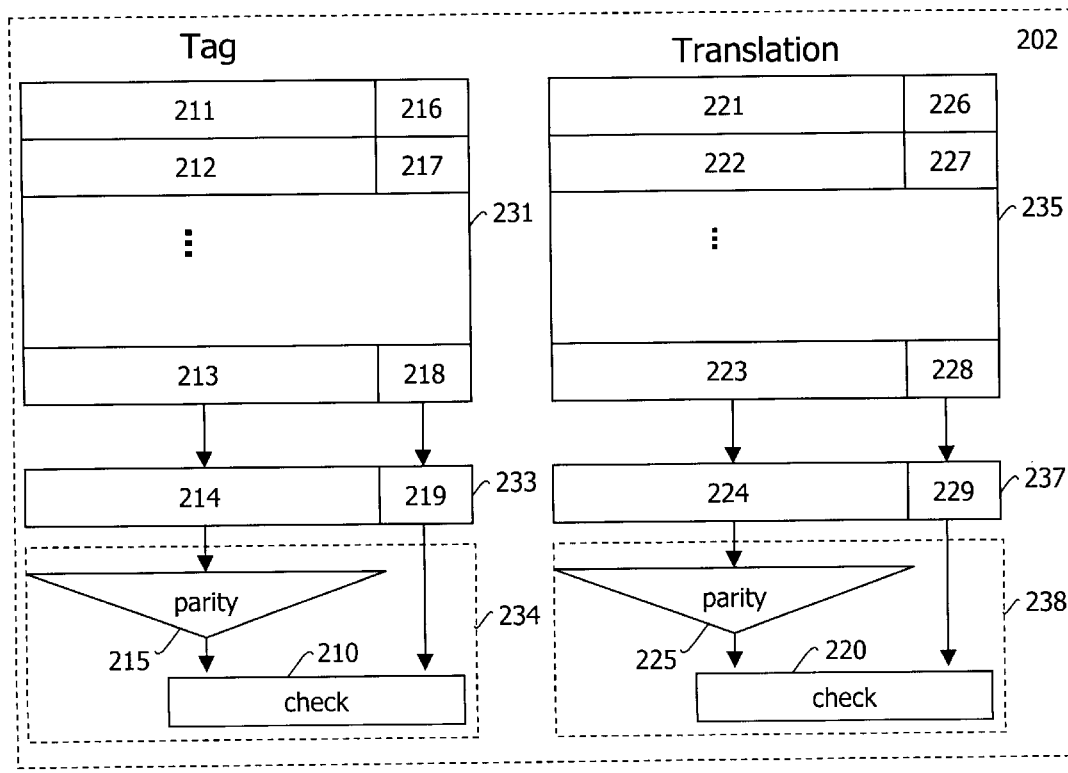
FIG. 2 illustrates one embodiment of an apparatus for detecting soft errors in a latched output of a TLB used in an address translation stage.

In one embodiment, an apparatus detects soft errors in a latched output of a TLB used in an address translation stage. FIG. 2 shows a tag array 231 for storing virtual address data and a translation array 235 for storing corresponding physical address data, security data, privilege data, etc. Tag array 231 includes data line 211 and corresponding parity bit 216, data line 212 and corresponding parity bit 217, other data lines and corresponding parity bits and finally, data line 213 and corresponding parity bit 218. Translation array 235 includes data line 221 and corresponding parity bit 226, data line 222 and corresponding parity bit 227, other data lines and corresponding parity bits and finally, data line 223 and corresponding parity bit 228. When data is read from tag array 231 and from corresponding translation array 235 it is may be latched by latch 233 and latch 237 respectively. Latch 233 includes both data portion 214 and parity portion 219 for checking the latched output of tag array 231. Similarly, latch 237 includes both data portion 224 and parity portion 229 for checking the latched output of translation array 235.

When virtual address data is read from tag array 231 and stored to latch 233 the latched output of data portion 214 is used to by parity tree 215 to generate a parity bit, which is used by checker 210 to compare against a stored parity bit in parity portion 219 to detect occurrence of a soft error. Likewise, when physical address data, security data and privilege data is read from translation array 235 and stored to latch 237 the latched output of data portion 224 is used to by parity tree 225 to generate a parity bit, which is used by checker 220 to compare against a stored parity bit in parity portion 229 to detect occurrence of a soft error.

It will be appreciated that a parity bit is useful in detecting single-bit errors, and that the example should be regarded as illustrative. For example, when increasing circuit densities increase the probability of two or more errors, other known techniques for multiple error detection may be used instead. It will also be appreciated that TLB storage structures often use parity for detecting soft errors within the array.

Figure 3:
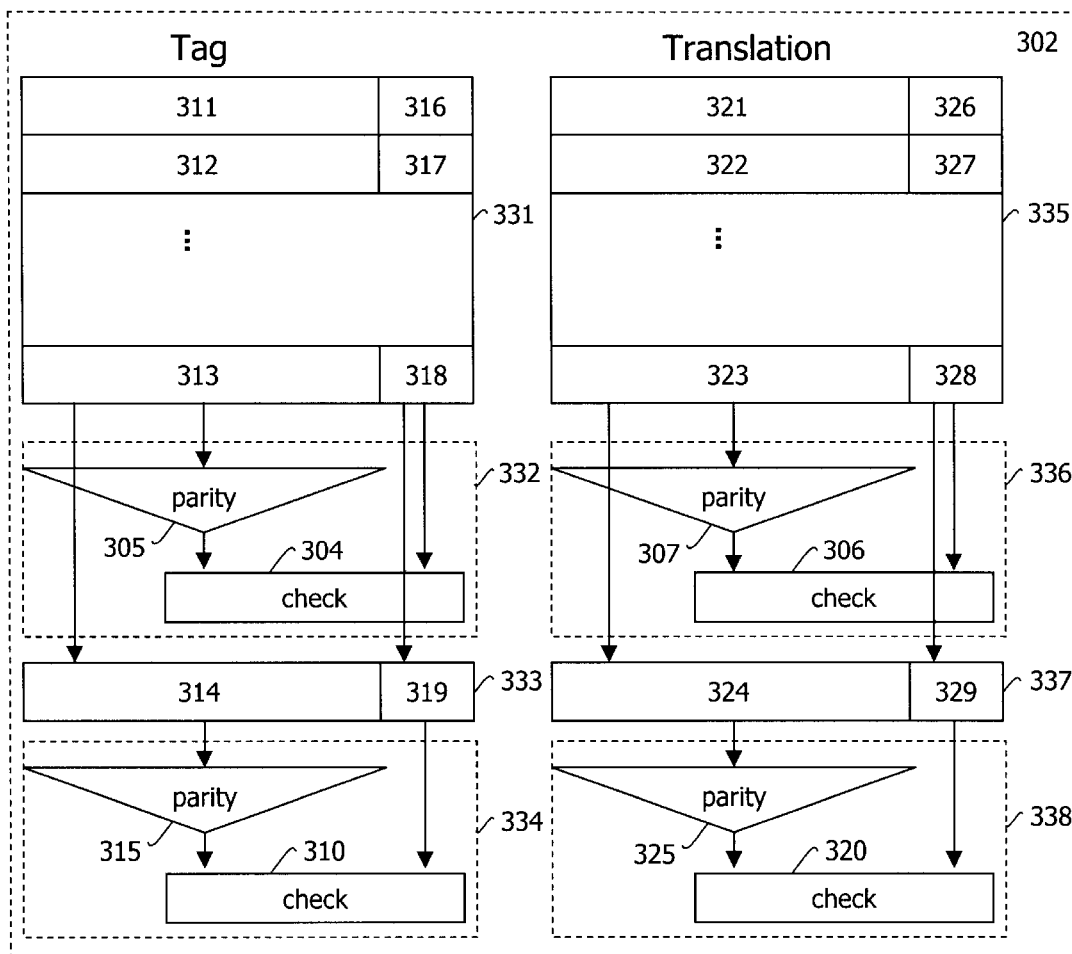
FIG. 3 illustrates an alternative embodiment of an apparatus for detecting soft errors in a latched output of a TLB used in an address translation stage.

For one alternative embodiment of an apparatus for detecting soft errors in a latched output of a TLB used in an address translation stage, FIG. 3 shows a tag array 331 for storing virtual address data and a translation array 335 for storing corresponding physical address data, security data, privilege data, etc. Tag array 331 includes data line 311 and corresponding parity bit 316, data line 312 and corresponding parity bit 317, other data lines and corresponding parity bits and finally, data line 313 and corresponding parity bit 318. Translation array 335 includes data line 321 and corresponding parity bit 326, data line 322 and corresponding parity bit 327, other data lines and corresponding parity bits and finally, data line 323 and corresponding parity bit 328. When virtual address data is read from tag array 331 it is used to by parity tree 305 to generate a parity bit, which is used by checker 304 to compare against a stored parity bit to detect occurrence of a soft error in tag array 331. Likewise, when physical address data, security data and privilege data is read from translation array 335 it is used to by parity tree 307 to generate a parity bit, which is used by checker 306 to compare against a stored parity bit to detect occurrence of a soft error in translation array 336.

When data is read from tag array 331 and from corresponding translation array 335 it is may also be latched by latch 333 and latch 337 respectively. Latch 333 includes both data portion 314 and parity portion 319 for checking the latched output of tag array 331. Similarly, latch 337 includes both data portion 324 and parity portion 329 for checking the latched output of translation array 335.

When virtual address data is read from tag array 331 and stored to latch 333 the latched output of data portion 314 is used by parity tree 315 to generate a parity bit, which is used by checker 310 to compare against a stored parity bit in parity portion 319 to detect occurrence of a soft error. Likewise, when physical address data, security data and privilege data is read from translation array 335 and stored to latch 337 the latched output of data portion 324 is used by parity tree 325 to generate a parity bit, which is used by checker 320 to compare against a stored parity bit in parity portion 329 to detect occurrence of a soft error.

Figure 4A:
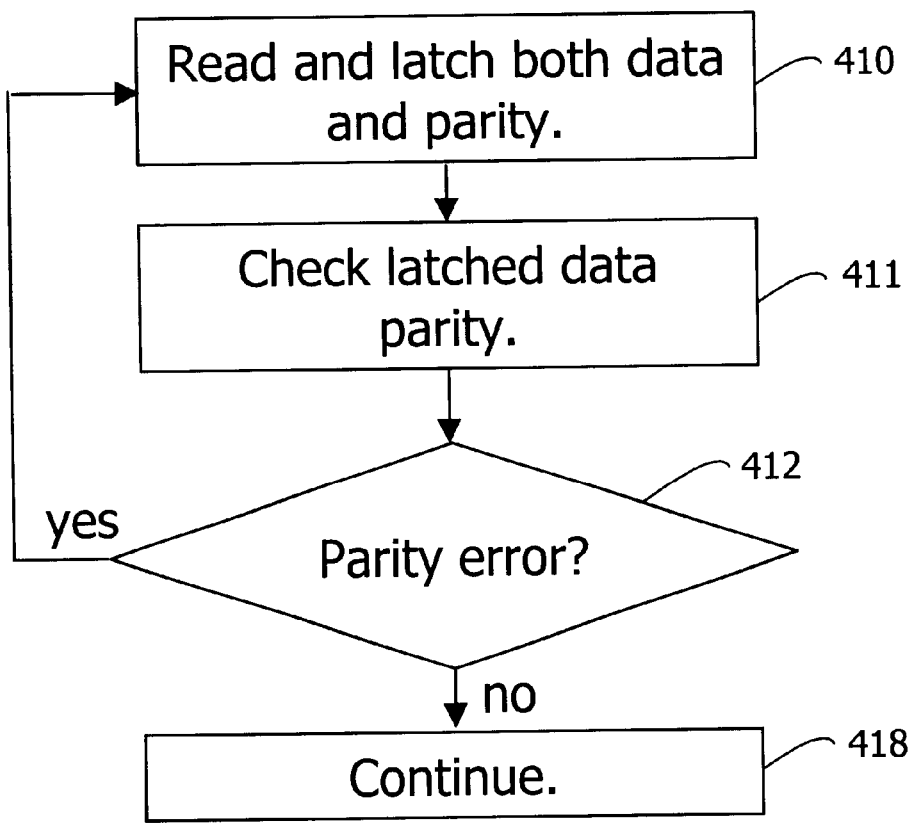
FIG. 4a illustrates one embodiment of a process for preventing and recovering from data corruption by soft errors.

FIG. 4a illustrates a diagram of one embodiment of a process for preventing and recovering from data corruption in a storage latch by soft errors. The process is performed by processing blocks that may comprise software or firmware operation codes executable by general purpose machines or by special purpose machines or by a combination of both. In processing block 410, a data portion a corresponding parity portion is read out from an array and both portions are latched. In processing block 411, the parity of the latched data portion is checked against the latched parity portion. In processing block 412, the result of the parity check is used to control processing flow. If no parity error is identified, then processing flow continues in processing block 418.

Otherwise a parity error has been detected. It will be appreciated that the data being read from the array typically has error detection, and that an error later detected in the latched data indicates a soft error has occurred in the storage latch. Accordingly, if a parity error is detected in processing block 412, then recovery may be achieved by rereading the data portion and the parity portion from the array. Therefore processing is repeated in processing block 410. It will also be appreciated that the process disclosed above may be useful in recovering from other single bit errors occurring in storage devices such as latches, registers or flip-flops, regardless of the cause of the error. It will further be appreciated that multiple bit errors may also be detected using known schemes other than parity, for example Hamming codes.

In some cases it is may not be assumed that the array data is uncorrupted. In such cases, recovery may also be achieved. Whenever a miss occurs in a TLB, the physical address data and other TLB data may be recovered from page tables in main memory. Most modern processors use a mechanism called a page walker to access page tables in memory and compute physical addresses on TLB misses.

Figure 4B:
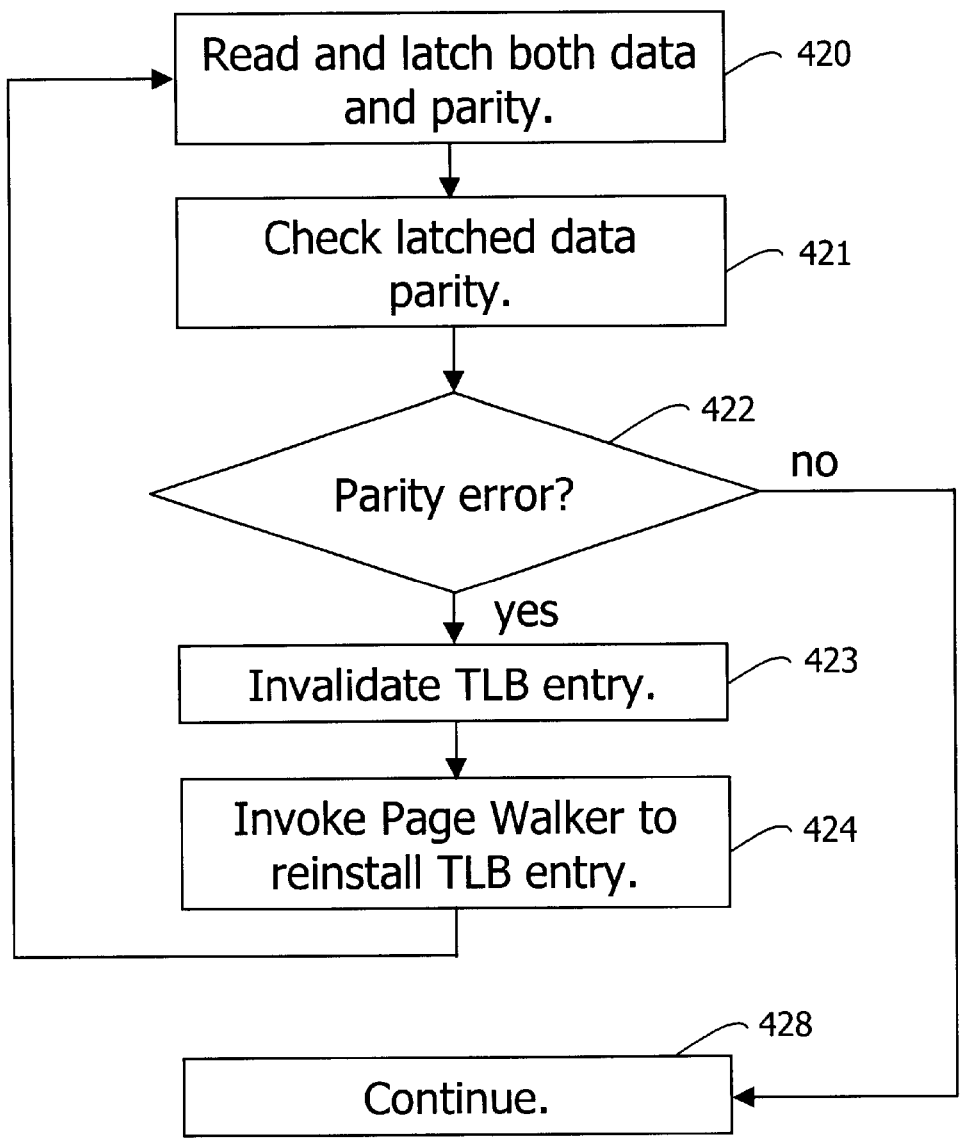
FIG. 4b illustrates an alternative embodiment of a process for preventing and recovering from data corruption by soft errors.

FIG. 4b illustrates a diagram of an alternative embodiment of a process for preventing and recovering from TLB data corruption by soft errors. In processing block 420, a data portion a corresponding parity portion is read out from an array and both portions are latched. In processing block 421, the parity of the latched data portion is checked against the latched parity portion. In processing block 422, the result of the parity check is used to control processing flow. If no parity error is identified, then processing flow continues in processing block 428.

Otherwise a parity error has been detected. Since it is not known if a soft error has occurred in the storage array or later in a storage latch, the array data may need to be reinstalled. Accordingly, if a parity error is detected in processing block 422, then recovery may be initiated by invalidating the erroneous data portion in the TLB arrays in accordance with processing block 423. In processing block 424, the page walker is invoked to reinstall the invalidated entry. The TLB entry having been restored, the data portion and the parity portion may be reread from the array. Therefore processing is repeated in processing block 420.

Thus the page walker may be used to recover from a soft error without resorting to error correcting codes and redundant state. It will be appreciated that in order for a hardware mechanism to achieve recovery in accordance with the above disclosed methods, it may be necessary to provide for stalling the pipeline progression and for repeating instruction sequences.

In particular, for a typical instruction TLB there are built-in recirculation mechanisms. When an error in the latched TLB data is detected, the pipeline may be stalled, the TLB entry may be invalidated and the page walker may be invoked as if a TLB miss had occurred. By restoring the instruction pointer and restarting the instruction fetch, recovery from the detected soft error may be effected with an overhead essentially equivalent to a TLB miss and a branch misprediction.

Figure 5A:
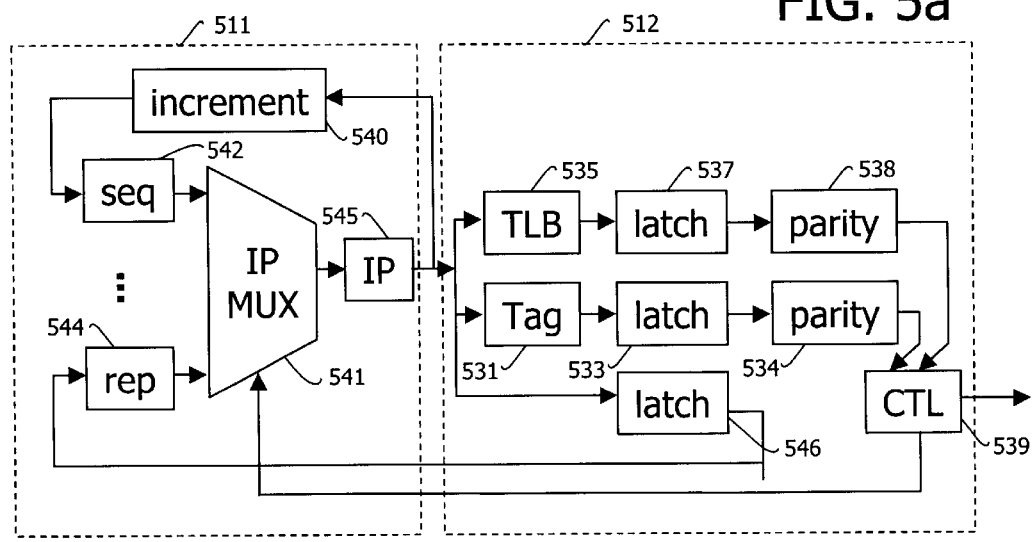
FIG. 5a illustrates one embodiment of a mechanism for detecting and recovering from data corruption by soft errors.

In one embodiment a mechanism for detects and recovers from TLB corruption by soft errors. FIG. 5a illustrates an instruction steering stage 511 and an address translation stage 512. Address translation stage 512 includes a tag array 531 for storing virtual address data and a translation array 535 for storing corresponding physical address data, security data, privilege data, etc.

When data is read from tag array 531 and from corresponding translation array 535 it is may be latched by latch 533 and latch 537 respectively. Latch 533 includes both a data portion and a parity portion for checking the latched output of tag array 531. Similarly, latch 237 includes both a data portion and parity portion for checking the latched output of translation array 535.

When virtual address data is read from tag array 531 and stored to latch 533 the latched output of the data portion may be used by parity unit 534 to generate a parity bit, which may then be checked against the latched parity bit to detect occurrence of a soft error. Likewise, when physical address data, security data and privilege data is read from translation array 535 and stored to latch 537 the latched output of the data portion may be used to by parity unit 538 to generate a parity bit, which may be checked against the stored parity to detect occurrence of a soft error. Detected soft error occurrences may be used by control 539 to transmit control signals to other pipeline stages or functional units, for invalidating TLB entries, stalling pipeline progression and steering instructions.

For example instruction steering stage 511 includes instruction pointer multiplexer (IP MUX 541) to provide an instruction pointer (IP 545) to the translation array 535, tag array 531, latch 546, and incrementation unit 540. IP MUX 541 receives alternative instruction pointers including a sequential instruction pointer (seq 542) from incrementation unit 540, and a replay instruction pointer (rep 544) from latch 546. Responsive to a control signal from control 539, IP MUX 541 may be used to steer instruction fetching along a sequential execution path or onto a repetition of a previously fetched path, thereby providing for soft error recovery. It will be appreciated that modern processors may include built-in recirculation mechanisms, having additional complexities to provide for additional execution conditions.

Figure 5B:
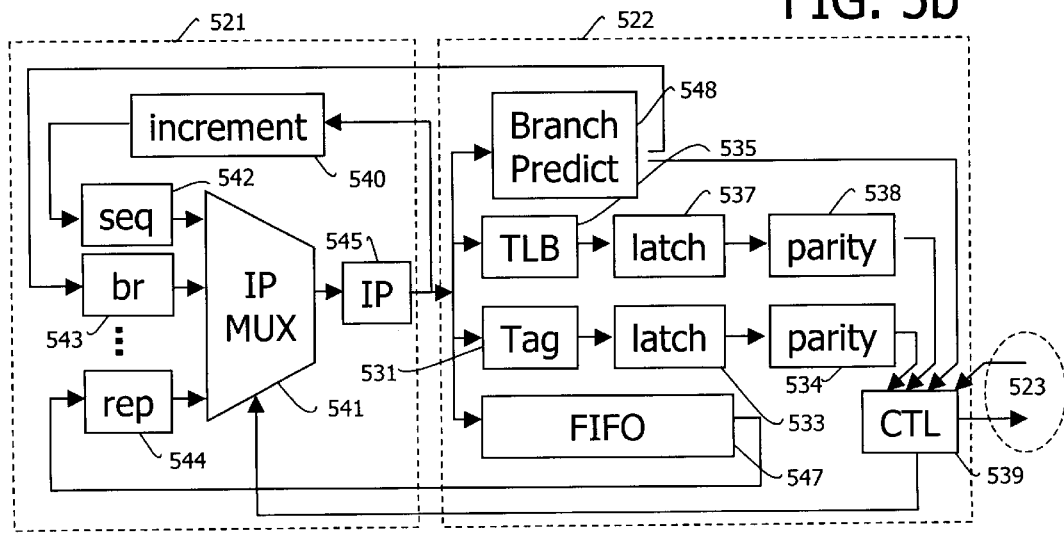
FIG. 5b illustrates an alternative embodiment of a mechanism for detecting and recovering from data corruption by soft errors.

FIG. 5b illustrates an alternative embodiment of a mechanism for detecting and recovering from TLB corruption by soft errors. An instruction steering stage 521 and an address translation stage 522 are shown. Address translation stage 522 includes a tag array 531 for storing virtual address data and a translation array 535 for storing corresponding physical address data, security data, privilege data, etc. When data is read from tag array 531 and from corresponding translation array 535 it is may be latched by latch 533 and latch 537 respectively. Latch 533 includes both a data portion and a parity portion for checking the latched output of tag array 531. Similarly, latch 237 includes both a data portion and parity portion for checking the latched output of translation array 535.

When virtual address data is read from tag array 531 and stored to latch 533 the latched output of the data portion may be used by parity unit 534 to generate a parity bit, which may then be checked against the latched parity bit to detect occurrence of a soft error. Likewise, when physical address data, security data and privilege data is read from translation array 535 and stored to latch 537 the latched output of the data portion may be used to by parity unit 538 to generate a parity bit, which may be checked against the stored parity to detect occurrence of a soft error. Soft error occurrences may be detected similarly in later pipeline stages. Detected soft error occurrences may be used by control 539 to transmit control signals to other pipeline stages or functional units, for invalidating TLB entries, stalling pipeline progression, invoking a hardware page walker, and steering instructions.

For example instruction steering stage 511 includes instruction pointer multiplexer (IP MUX 541) to provide an instruction pointer (IP 545) to the branch prediction unit 548, translation array 535, tag array 531, FIFO 547, and incrementation unit 540. IP MUX 541 receives alternative instruction pointers including a sequential instruction pointer (seq 542) from incrementation unit 540, a branch target instruction pointer (br 543) from branch prediction unit 548, and one or more replay instruction pointers (rep 544) from FIFO 546. According to which stage detects the soft error, FIFO 546 and control 539 may provide for replay sequences of various lengths. Responsive to a control signal from control 539, IP MUX 541 may be used to steer instruction fetching along a sequential execution path or onto a repetition of a previously fetched path, thereby providing for soft error recovery.

Through use of, a soft error detection mechanism, an instruction steering mechanism and a hardware page walker, efficient soft error recovery in TLB arrays and latches may be provided. In the worst case, the hardware page walker does not succeed and a trap may be taken. Following execution of a trap handler, execution may be resumed at the instruction that caused the trap, which in this case is the instruction that incurred the soft error.

Figure 6:
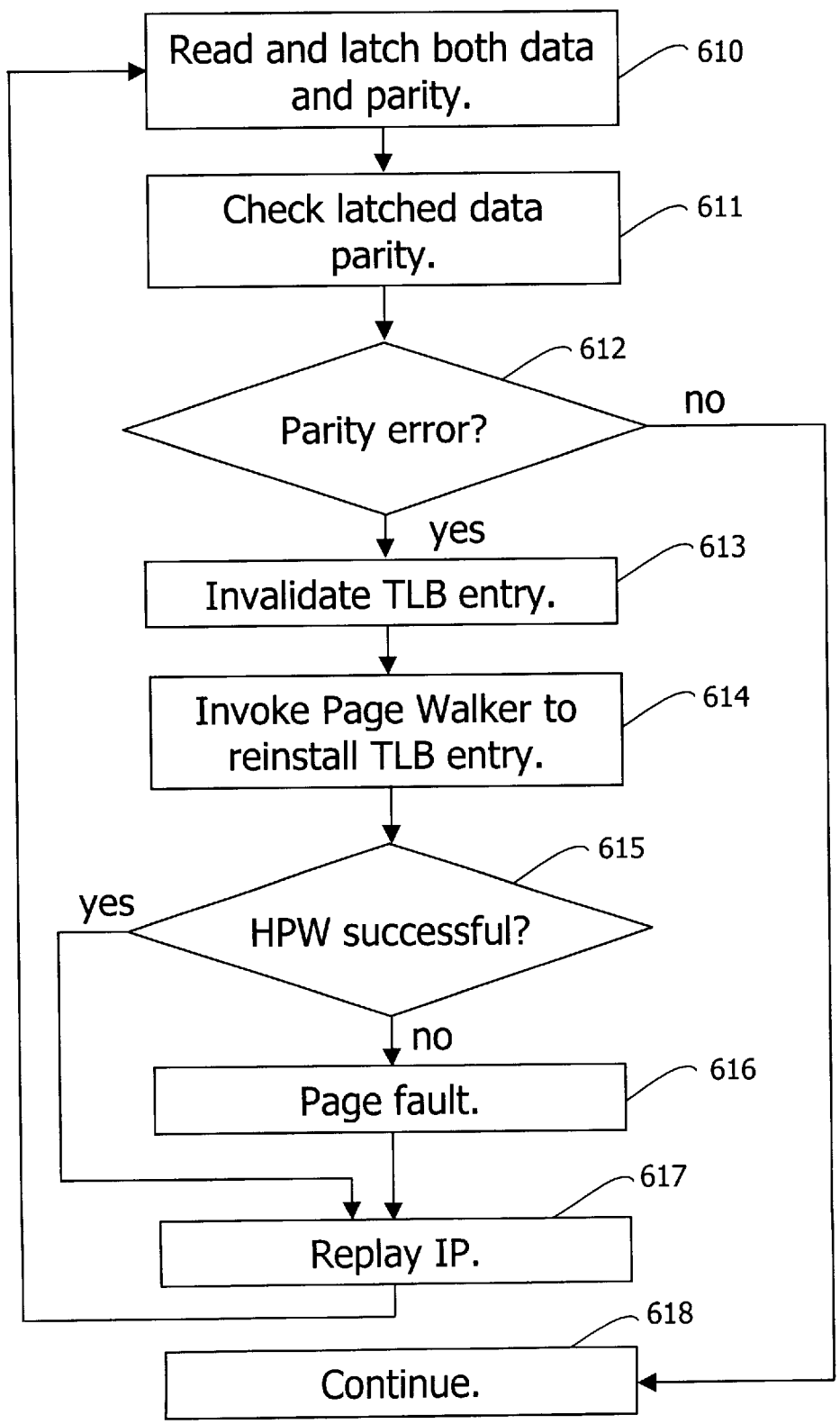
FIG. 6 illustrates an alternative embodiment of a process for preventing and recovering from data corruption by soft errors.

FIG. 6 illustrates a diagram of another alternative embodiment of a process for preventing and recovering from TLB data corruption by soft errors. In processing block 610, a data portion a corresponding parity portion is read out from an array and both portions are latched. In processing block 611, the parity of the latched data portion is checked against the latched parity portion. In processing block 612, the result of the parity check is used to control processing flow. If no parity error is identified, then processing flow continues in processing block 618.

Otherwise a parity error has been detected. Since it may not be known if a soft error has occurred in the storage array or later in a storage latch, the array data may need to be reinstalled. Accordingly, if a parity error is detected in processing block 612, then recovery may be initiated by invalidating the erroneous data portion in the TLB arrays in accordance with processing block 613. In processing block 614, the page walker is invoked to reinstall the invalidated entry. In processing block 615, if the hardware page walker has been successful, then processing proceeds to processing block 617 where the instruction pointer is replayed. Otherwise, a page fault trap is taken and the TLB entry is restored from the operating system page tables. Processing then continues at processing block 617 where the instruction pointer is replayed. The TLB entry having been restored, the data portion and the parity portion may be reread from the array. Therefore processing is repeated in processing block 610.

It will be appreciated that TLB corruption affecting the translation of an instruction address occurs very early in the pipeline and consequently a relatively small amount of pipeline state needs to be discarded. For a data TLB access a TLB miss occurs much later in the pipeline. Therefore recovery from soft errors requires extra care to ensure that no side effects take place.

Figure 7:
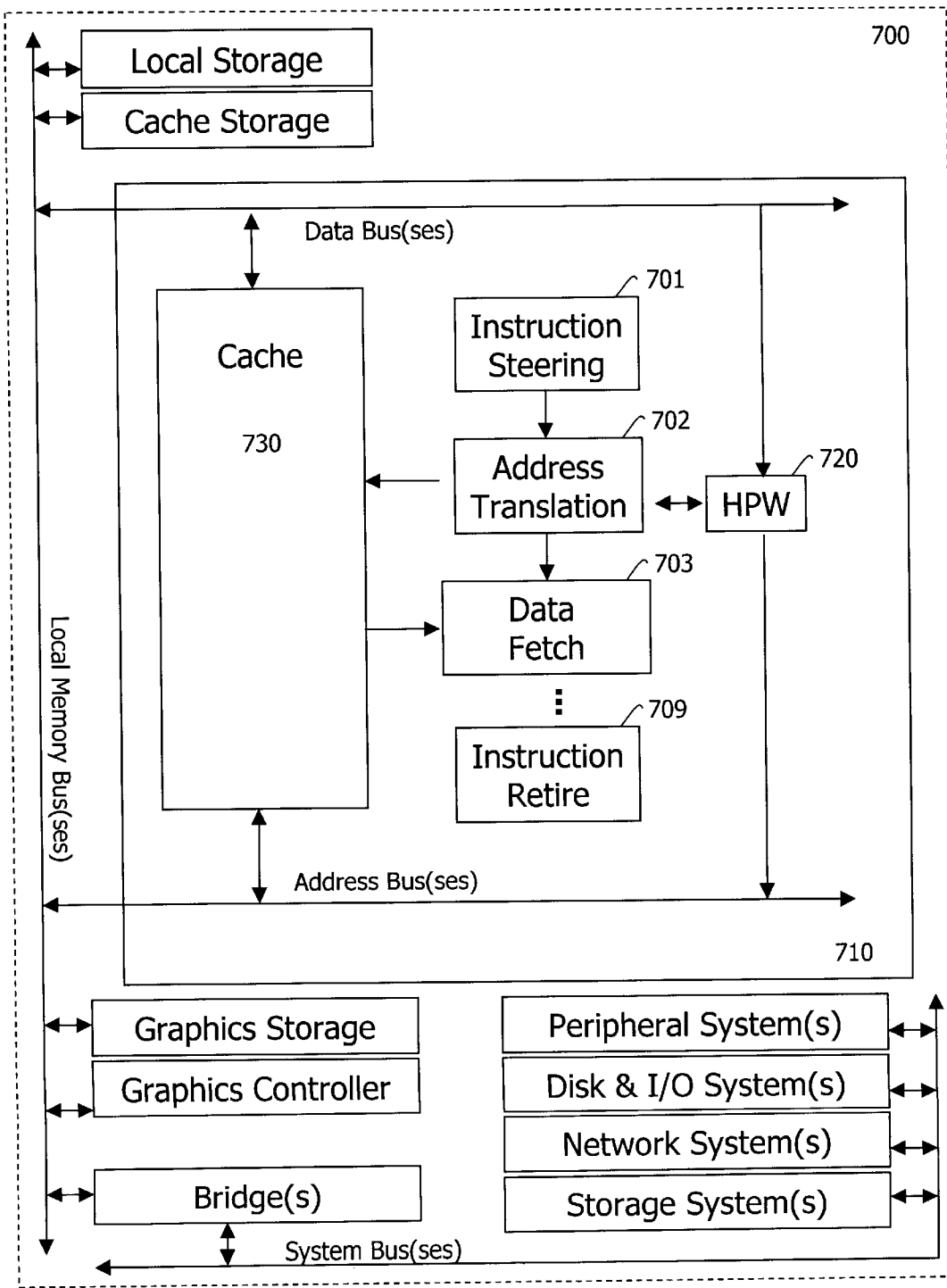
FIG. 7 illustrates one embodiment of a computing system including a processor with a mechanism for detecting and recovering from data corruption by soft errors.

FIG. 7 illustrates one embodiment of a processor 710 including a pipeline comprising an address translation stage 702, and instruction steering stage 701. If translated data is corrupted due to soft errors, the error may be detected in address translation stage 702 or in data fetch stage 703. Accordingly a pipeline stall may be generated and hardware page walker (HPW 720) may be invoked to reinstall the corrupted translation data. If necessary, corrupted pipeline state may be discarded and instruction steering stage 701 may be used to provide an instruction pointer for replaying the instruction affected by soft error.

It will be appreciated that processor 710 may comprise a single die or may comprise multiple dies and that the pipeline of processor 710 may comprise additional stages including but not limited to an instruction retire stage 709. It will also be appreciated processor 810 may further comprise cache storage 730, address busses, data busses, bus control circuitry or other communication circuitry.

FIG. 7 further illustrates an embodiment of computing system 700 including a processor 710 having HPW 720 and a pipeline comprising an address translation stage 702, and an instruction steering stage 701. Computing system 700 may comprise a personal computer including but not limited to central processor 710, graphics storage, other cache storage and local storage; system bus(ses), local bus.(ses) and bridge(s); peripheral systems, disk and input/output systems, network systems and storage systems. It will be appreciated that tradeoffs may be made between system cost, performance and reliability by providing for configurable error detection and recovery. This may be accomplished in a variety of ways, for example a writable bit field in a mode specific register may be provided to enable or disable error checking for one or more stages. Alternatively this may also be accomplished through other known configuration techniques such as setting a fuse during a manufacturing sort process or sampling one or more I/O pins during a system boot procedure.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. An article of manufacture having one or more recordable medium having machine executable code stored thereon which, when executed by a machine, causes the machine to:

access a TLB entry including a data portion and an error checking portion having one or more first error checking bits;

store the data portion and the corresponding error checking portion;

use the stored error checking portion to identify an error condition for the stored data portion;

invalidate the TLB entry responsive to identification of the error condition; and repeat the access of the TLB entry.

2. The article of manufacture recited in claim 1 which, when executed by a machine, further causes the machine to:

invoke a page walker to reinstall the TLB entry.

3. The article of manufacture recited in claim 2 wherein the access of the TLB entry was valid.

4. The article of manufacture recited in claim 1 which, when executed by a machine, further causes the machine to:

store an instruction pointer corresponding to the TLB entry; and replay the instruction pointer.

5. The article of manufacture recited in claim 4 wherein data portion of the TLB entry was error free prior to the data portion being stored.

6. The article of manufacture recited in claim 4 which, when executed by a machine, further causes the machine to:

stall a processor pipeline stage responsive to identification of the error condition.

7. The article of manufacture recited in claim 1 wherein said using of the stored error checking portion to identify an error condition comprises causing the machine to:

generate one or more second error checking bits for the stored data portion; and compare the one or more first error checking bits with the one or more second error checking bits to identify an error condition.

8. The article of manufacture recited in claim 7 wherein the error checking portion comprises a parity bit.

9. A method comprising:

accessing a TLB entry including a data portion and an error checking portion having one or more first error checking bits;

storing the data portion and the corresponding error checking portion;

generating one or more second error checking bits for the stored data portion;

comparing the one or more first error checking bits with the one or more second error checking bits to identify an error condition;

invalidating the TLB entry responsive to identification of the error condition; and repeating the access of the TLB entry.

10. The method recited in claim 9 wherein the error checking portion comprises a parity bit.

11. The method recited in claim 9 further comprising:

invoking a page walker to reinstall the TLB entry.

12. The method recited in claim 11 wherein the access of the TLB entry was valid.

13. The method recited in claim 9 further comprising:

storing an instruction pointer corresponding to the TLB entry; and replaying the instruction pointer.

14. The method recited in claim 13 further comprising:

stalling a processor pipeline stage responsive to identification of the error condition.

15. The method recited in claim 13 wherein the data portion of the TLB entry was error free prior to the data portion being stored.

16. A processing system comprising:

means for accessing a TLB entry including a data portion and an error checking portion;

means for storing the data portion and the corresponding error checking portion;

means for checking the stored data portion to identify an error condition;

means for reinstalling the TLB entry; and means for repeating the TLB entry access.

17. The processing system of claim 16 further comprising:

means for stalling a processor pipeline stage responsive to identification of the error condition.

18. An apparatus comprising:

a pipeline address translation stage including a storage array having a plurality of entries to associate virtual address data with corresponding physical address data;

a first storage element to store a first data from an entry of the plurality of entries of the storage array;

an error checking circuit to identify an error in the first data and to generate an error condition signal; and a first control unit to generate a recirculation request signal responsive to the error condition signal.

19. The apparatus of claim 18 wherein:

the first storage element is a latch.

20. The apparatus of claim 18 wherein the error to be identified in the first data is a parity error.

21. The apparatus of claim 20 wherein the first storage element is further to store a parity bit from the entry.

22. The apparatus of claim 18 further comprising:

a second storage element to store a first instruction pointer.

23. The apparatus of claim 22 further comprising:

a multiplexer to selectively provide a second instruction pointer from a plurality of inputs including the stored first instruction pointer, the multiplexer to provide the second instruction pointer equal to the stored first instruction pointer responsive to the recirculation request signal.

24. The apparatus of claim 23 further comprising:

a second control unit to stall a pipeline stage responsive to the error condition signal.

25. The apparatus of claim 23 further comprising:

a second control unit to stall a pipeline stage responsive to the error condition signal.

26. The apparatus of claim 18 further comprising:

a third control unit to generate an invalidation signal for the entry in response to the error condition signal.

27. The apparatus of claim 18 further comprising:

a third control unit to generate an invalidation signal for the entry in response to the error condition signal; and hardware page walker to reinstall the entry responsive to the invalidation signal.

28. An computing system comprising:

a pipeline address translation stage including a storage array having a plurality of entries to associate virtual address data with corresponding physical address data;

a first storage element to store a first data from an entry of the plurality of entries of the storage array;

an error checking circuit to identify an error in the first data and to generate an error condition signal; and a first control unit to generate a recirculation request signal responsive to the error condition signal.

29. The apparatus of claim 28 wherein the first storage element is further to store a parity bit from the entry.

30. The apparatus of claim 28 further comprising:

a second storage element to store a first instruction pointer; and a multiplexer to selectively provide a second instruction pointer from a plurality of inputs including the stored first instruction pointer, the multiplexer to provide the second instruction pointer equal to the stored first instruction pointer responsive to the recirculation request signal.

* * * * *

UNITED STATES PATENT AND TRADEMARK OFFICE
CERTIFICATE OF CORRECTION

PATENT NO. : 6,718,494 B1
DATED : April 6, 2004
INVENTOR(S) : Jamil et al.

It is certified that error appears in the above-identified patent and that said Letters Patent is hereby corrected as shown below:

<u>Title page,</u>
Item [75], Inventors, delete "Hguyen" and insert -- Nguyen --.

Signed and Sealed this

Twenty-sixth Day of July, 2005

JON W. DUDAS
*Director of the United States Patent and Trademark Office*